US011888271B2

(12) United States Patent
Wang et al.

(10) Patent No.: US 11,888,271 B2
(45) Date of Patent: Jan. 30, 2024

(54) ELECTRIC CONNECTOR WITH FOOL-PROOF STRUCTURE AND ELECTRIC CONNECTOR ASSEMBLY THEREOF

(71) Applicant: DONGGUAN LEADER PRECISION INDUSTRY CO., LTD., Dongguan (CN)

(72) Inventors: Bo Wang, Dongguan (CN); Xiaolei Lv, Dongguan (CN); Jiamei Wan, Dongguan (CN); Jinqi Li, Dongguan (CN)

(73) Assignee: DONGGUAN LEADER PRECISION INDUSTRY CO., LTD., Dongguan (CN)

( * ) Notice: Subject to any disclaimer, the term of this patent is extended or adjusted under 35 U.S.C. 154(b) by 94 days.

(21) Appl. No.: 17/475,656

(22) Filed: Sep. 15, 2021

(65) Prior Publication Data

US 2022/0094120 A1 Mar. 24, 2022

(30) Foreign Application Priority Data

Sep. 23, 2020 (CN) ........................ 202011007179.5

(51) Int. Cl.
*H01R 24/64* (2011.01)
*H01R 12/71* (2011.01)
(Continued)

(52) U.S. Cl.
CPC ......... *H01R 24/64* (2013.01); *H01R 12/7005* (2013.01); *H01R 12/716* (2013.01);
(Continued)

(58) Field of Classification Search
CPC .. H01R 24/64; H01R 12/7005; H01R 12/716; H01R 13/514; H01R 13/64;
(Continued)

(56) References Cited

U.S. PATENT DOCUMENTS 5,315,487 A 5/1994 Le Goe et al.
6,736,673 B1 * 5/2004 Simmons ............... H01R 24/64
439/541.5

(Continued)

FOREIGN PATENT DOCUMENTS

CN 2682669 Y 3/2005
CN 201196995 Y 2/2009

(Continued)

*Primary Examiner* — Abdullah A Riyami
*Assistant Examiner* — Justin M Kratt
(74) *Attorney, Agent, or Firm* — Birch, Stewart, Kolasch & Birch, LLP

(57) ABSTRACT

An electrical connector includes an insulating body, a first installation module and a second installation module. The first installation module includes a first internal circuit board and a first terminal adapter block. The second installation module includes a second internal circuit board and a second terminal adapter block. The first internal circuit board and the first terminal adapter block include first fool-proof portions that cooperate with each other. The second internal circuit board and the second terminal adapter block include second fool-proof portions that cooperate with each other. The first fool-proof portions are different from the second fool-proof portions, thereby preventing the first terminal adapter block from being incorrectly connected to the second internal circuit board, and preventing the second terminal adapter block from being incorrectly connected to the first internal circuit board. The present disclosure also relates to an electrical connector assembly having the electrical connector.

20 Claims, 8 Drawing Sheets

(51) Int. Cl.

| | |
|---|---|
| ***H01R 13/514*** | (2006.01) |
| ***H01R 13/64*** | (2006.01) |
| ***H01R 13/6581*** | (2011.01) |
| ***H01R 13/66*** | (2006.01) |
| ***H01R 12/70*** | (2011.01) |
| *H01R 13/46* | (2006.01) |
| *H01R 24/62* | (2011.01) |
| *H01R 24/60* | (2011.01) |

(52) U.S. Cl.
CPC ........... *H01R 13/514* (2013.01); *H01R 13/64* (2013.01); *H01R 13/6581* (2013.01); *H01R 13/665* (2013.01); *H01R 13/6658* (2013.01); *H01R 12/707* (2013.01); *H01R 12/7011* (2013.01); *H01R 12/7052* (2013.01); *H01R 12/7064* (2013.01); *H01R 13/465* (2013.01); *H01R 24/60* (2013.01); *H01R 24/62* (2013.01)

(58) Field of Classification Search
CPC .............. H01R 13/6581; H01R 13/665; H01R 13/6658; H01R 12/7011; H01R 12/7052; H01R 12/7064; H01R 12/707; H01R 13/465; H01R 24/60; H01R 24/62
See application file for complete search history.

(56) References Cited

U.S. PATENT DOCUMENTS

| | | | |
|---|---|---|---|
| 2005/0106939 | A1 | 5/2005 | Zhang et al. |
| 2007/0197073 | A1 | 8/2007 | Hu et al. |

FOREIGN PATENT DOCUMENTS

| | | | | | |
|---|---|---|---|---|---|
| CN | 201336712 | Y | | 10/2009 | |
| CN | 201498790 | U | | 6/2010 | |
| CN | 103731114 | A | | 4/2014 | |
| CN | 204088814 | U | | 1/2015 | |
| CN | 205355379 | U | | 6/2016 | |
| CN | 210498790 | U | * | 5/2020 | |
| JP | 1-309275 | A | | 12/1989 | |
| JP | 7-263883 | A | | 10/1995 | |
| JP | 2014089940 | A | * | 5/2014 | ............. H01R 12/52 |
| TW | M481524 | U | | 7/2014 | |

* cited by examiner

ELECTRIC CONNECTOR WITH FOOL-PROOF STRUCTURE AND ELECTRIC CONNECTOR ASSEMBLY THEREOF

CROSS-REFERENCE TO RELATED APPLICATION

This patent application claims priority of a Chinese Patent Application No. 202011007179.5, filed on Sep. 23, 2020 and titled "ELECTRIC CONNECTOR AND ELECTRIC CONNECTOR ASSEMBLY", the entire content of which is incorporated herein by reference.

TECHNICAL FIELD

The present disclosure relates to an electrical connector and an electrical connector assembly, which belongs to a technical field of connectors.

BACKGROUND

Some existing electrical connectors (such as RJ45 connectors) as data transmission connectors have been widely used in technical fields such as consumer electronics and communications. With the diversified development of the market, some application environments have higher requirements for the data transmission speed of the RJ45 connector port, while some application environments have lower requirements for the data transmission speed of the RJ45 connector port. It is well known that the shape and structure of the RJ45 connector port itself has been standardized by a standard, and the difference in the data transmission speed of the RJ45 connector port depends on the differences of a internal circuit board to which the RJ45 connector port is connected. In order to meet the market requirements, how to design ports with differentiated data transmission speeds and avoid the mixing of electrical connectors when assembling the internal circuit boards are technical problems that need to be solved by those skilled in the art.

SUMMARY

An object of the present disclosure is to provide an electrical connector which is capable of preventing internal circuit boards from being mixedly installed, and an electrical connector assembly having the electrical connector.

In order to achieve the above object, the present disclosure adopts the following technical solution: an electrical connector, including: an insulating body defining a first receiving space and a second receiving space; a first installation module, the first installation module being at least partially installed in the first receiving space, the first installation module including a first internal circuit board and a first terminal adapter block installed with the first internal circuit board; and a second installation module, the second installation module being at least partially installed in the second receiving space, the second installation module including a second internal circuit board and a second terminal adapter block installed with the second internal circuit board; wherein the first internal circuit board and the first terminal adapter block include first fool-proof portions mating with each other, the second internal circuit board and the second terminal adapter block include second fool-proof portions mating with each other, and the first fool-proof portions are different from the second fool-proof portions, so as to prevent the first terminal adapter block from being incorrectly connected to the second internal circuit board, and prevent the second terminal adapter block from being incorrectly connected to the first internal circuit board.

In order to achieve the above object, the present disclosure adopts the following technical solution: an electrical connector assembly, including: an external circuit board; and an electrical connector mounted to the external circuit board, the electrical connector including: an insulating body defining a first receiving space and a second receiving space; a first installation module, the first installation module being at least partially installed in the first receiving space, the first installation module including a first internal circuit board and a first terminal adapter block installed with the first internal circuit board; and a second installation module, the second installation module being at least partially installed in the second receiving space, the second installation module including a second internal circuit board and a second terminal adapter block installed with the second internal circuit board; wherein the first internal circuit board and the first terminal adapter block include first fool-proof portions mating with each other, the second internal circuit board and the second terminal adapter block include second fool-proof portions mating with each other, and the first fool-proof portions are different from the second fool-proof portions, so as to prevent the first terminal adapter block from being incorrectly connected to the second internal circuit board, and prevent the second terminal adapter block from being incorrectly connected to the first internal circuit board.

Compared with the prior art, by making the first fool-proof portions different from the second fool-proof portions in the present disclosure, the first terminal adapter block can be prevented from being incorrectly connected to the second internal circuit board, and the second terminal adapter block can be prevented from being incorrectly connected to the first internal circuit board.

DETAILED DESCRIPTION

Figure 1:
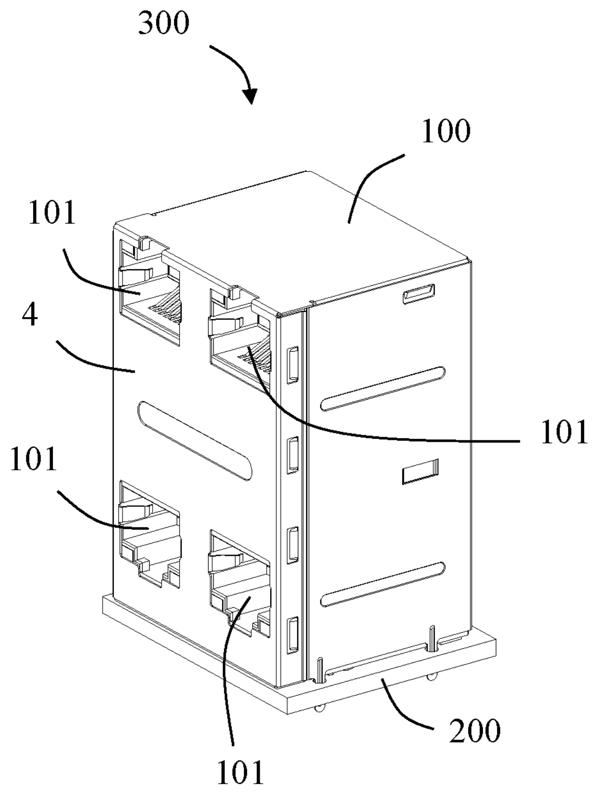
FIG. 1 is a perspective schematic view of an electrical connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
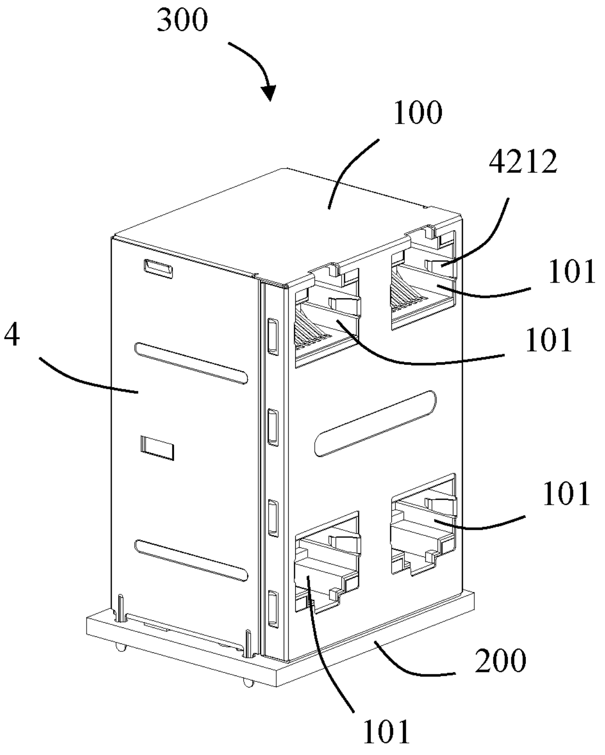
FIG. 2 is a perspective schematic view of FIG. 1 from another angle.
Figure 3:
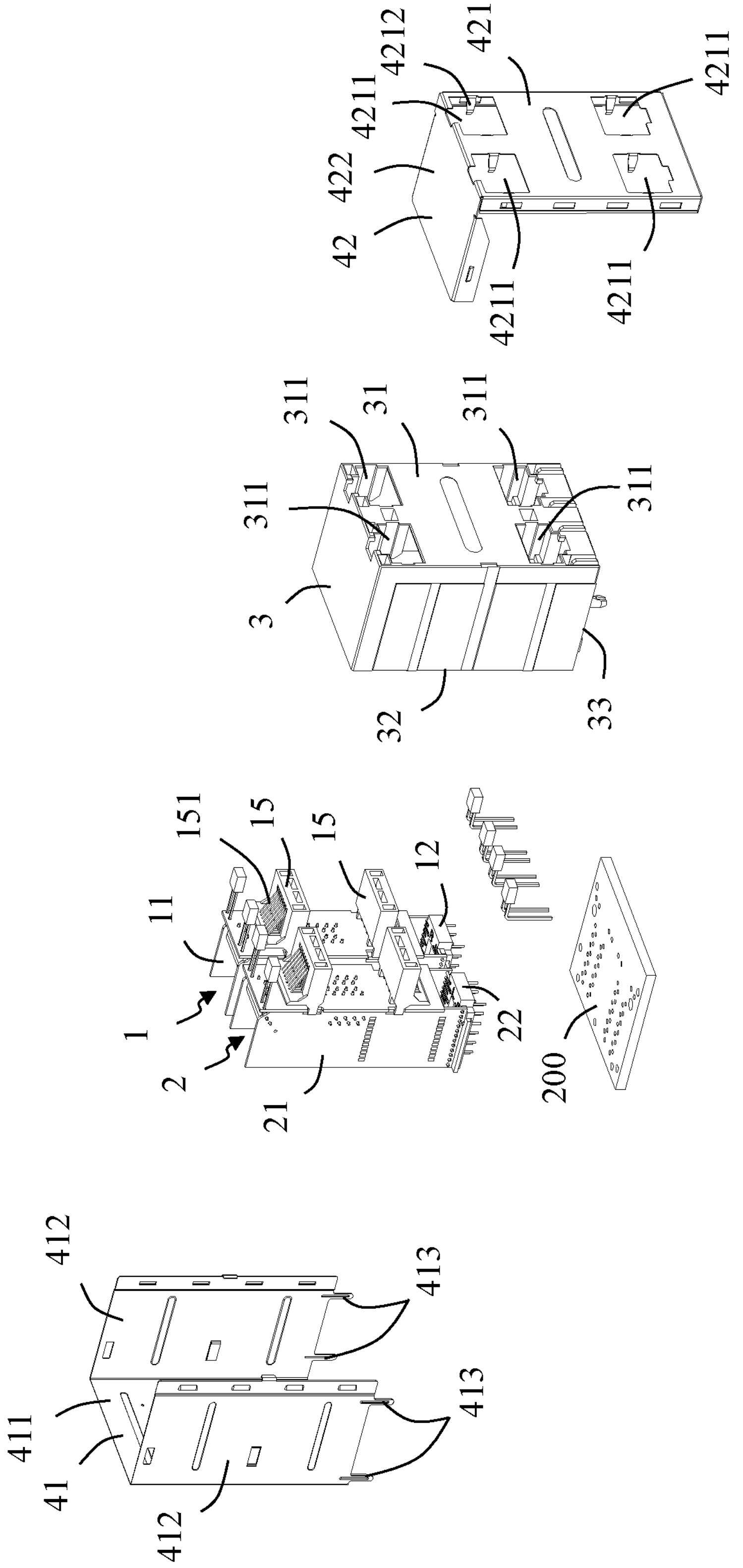
FIG. 3 is a partially exploded perspective view of FIG. 2.
Figure 4:
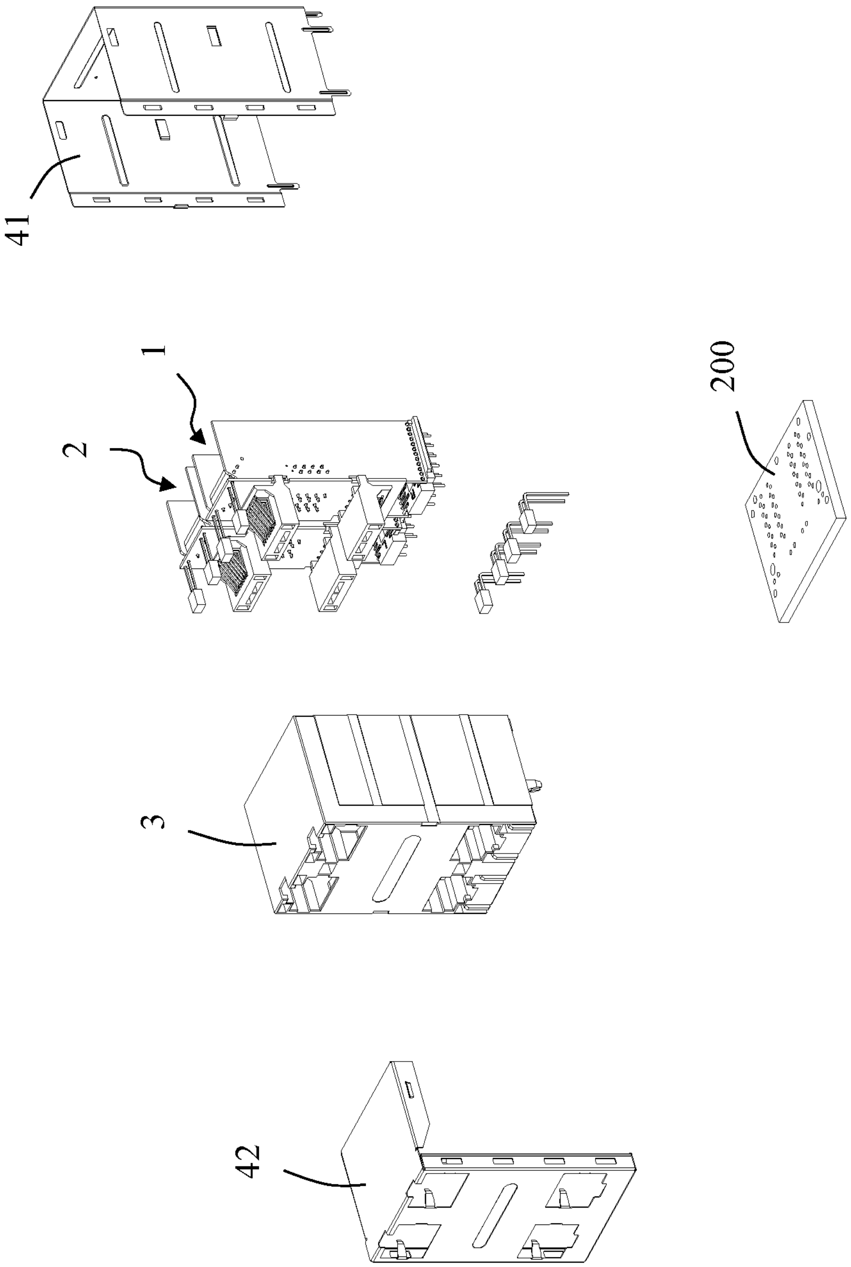
FIG. 4 is a partially exploded perspective view of FIG. 3 from another angle.
Figure 5:
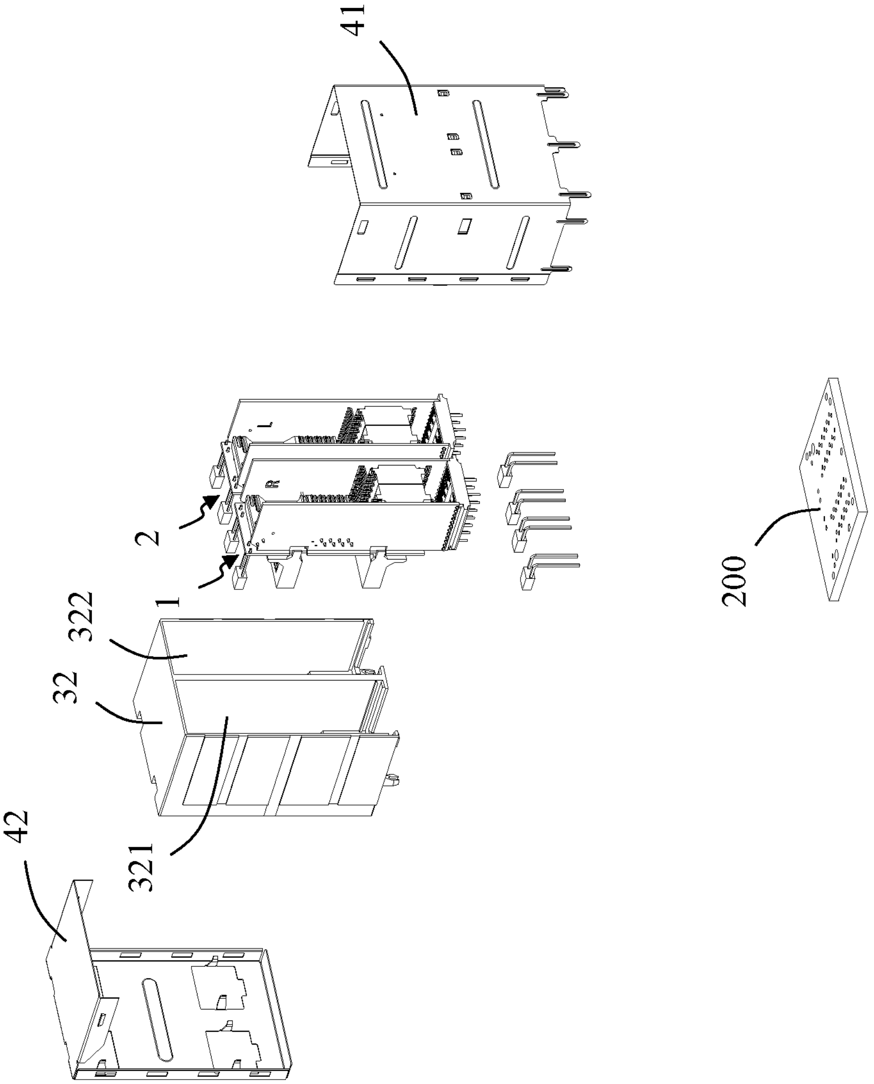
FIG. 5 is a partially exploded perspective view of FIG. 3 from another angle.
Figure 6:
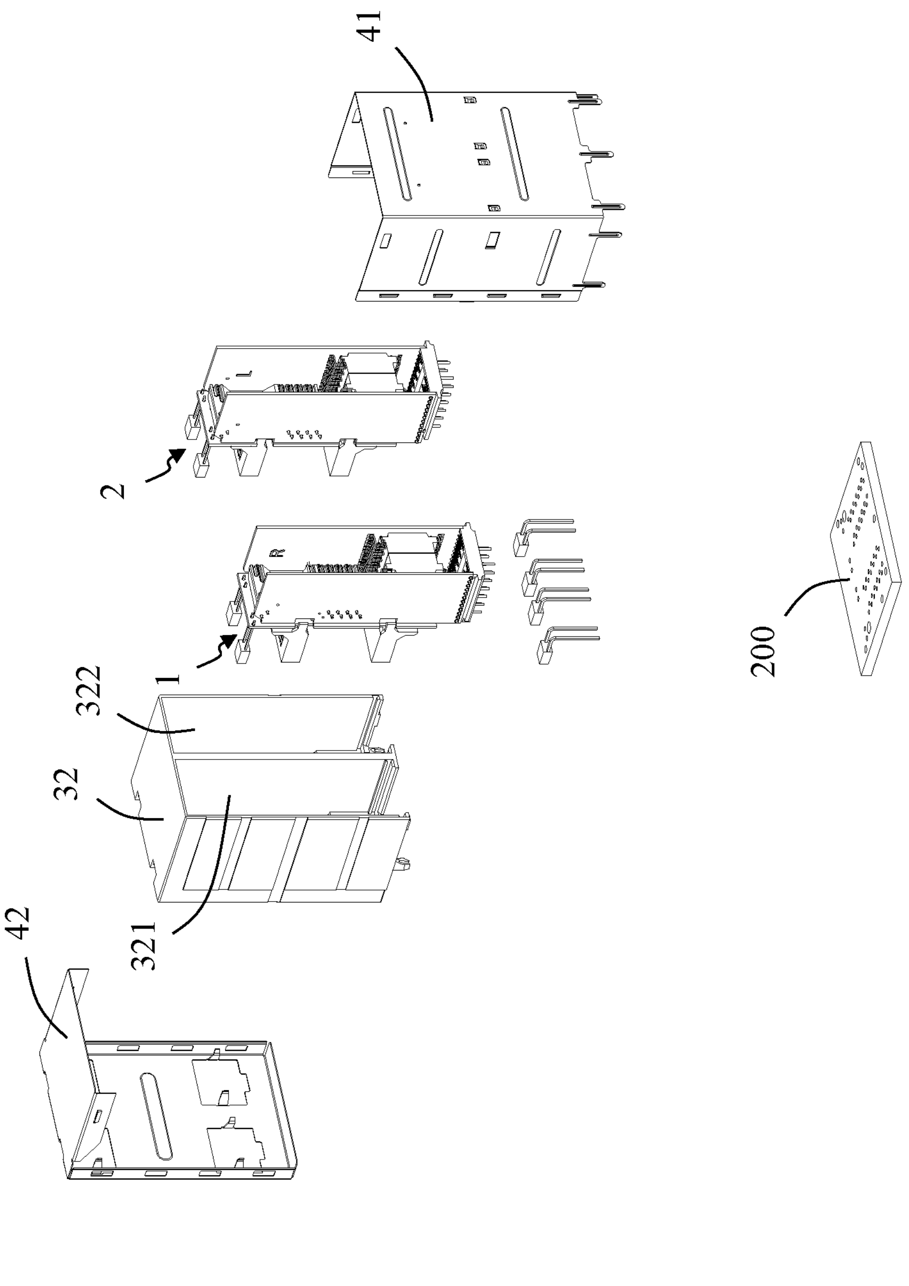
FIG. 6 is a further partial perspective exploded view of FIG. 5.

Referring to FIGS. 1 and 2, the present disclosure discloses an electrical connector assembly 300 including an external circuit board 200 and an electrical connector 100 mounted to the external circuit board 200. In the illustrated embodiment of the present disclosure, the electrical connector 100 is an RJ45 board-end connector which includes four ports 101. The four ports 101 are arranged in two rows and two columns. In the illustrated embodiment of the present disclosure, the two ports 101 located in an upper row and the two ports 101 located in a lower row are symmetrically arranged along a horizontal plane located therebetween.

Referring to FIGS. 3 to 6, the electrical connector 100 includes a first installation module 1, a second installation module 2, an insulating body 3 for at least partially receiving the first installation module 1 and the second installation module 2, and a metal shielding shell 4 enclosing the insulating body 3.

The insulating body 3 is roughly in the shape of a cuboid, and including a mating surface 31, an assembling surface 32 opposite to the mating surface 31, and a mounting surface 33 perpendicular to the mating surface 31 and the assembling surface 32. The insulating body 3 defines a plurality of port openings 311 extending through the mating surface 31. The port openings 311 correspond to the ports 101 respectively. The insulating body 3 also defines a first receiving space 321 and a second receiving space 322 which extend through the assembling surface 32. The first installation module 1 is at least partially received in the first receiving space 321. The second installation module 2 is at least partially received in the second receiving space 322. In an embodiment of the present disclosure, data transmission rates of the first installation module 1 and the second installation module 2 are different.

The metal shielding shell 4 includes a first metal shell 41 and a second metal shell 42 for mating with the first metal shell 41. The first metal shell 41 is substantially U-shaped, and includes a rear wall 411 for shielding the assembling surface 32 and two side walls 412 extending forwardly from two sides of the rear wall 411 respectively. The rear wall 411 and/or the side walls 412 include ground pins 413 extending downwardly and used to be inserted into the external circuit board 200.

The second metal shell 42 is substantially L-shaped, and includes a front wall 421 for shielding on the mating surface 31, and a top wall 422 extending from a top of the front wall 421 toward the first metal shell 41. The front wall 421 defines a plurality of openings 4211 corresponding to the port openings 311 and elastic arms 4212 located on both sides of each opening 4211. In the illustrated embodiment of the present disclosure, the elastic arms 4212 and the second metal shell 42 are integrally stamped so as to save cost. The elastic arms 4212 are used to engage with a mating connector, on one hand, it improves the retention force of the mating connector after insertion, and on the other hand, it can also play a grounding role. When assembling, the second metal shell 42 and the first metal shell 41 are locked together at the joint by a locking structure. By providing the metal shielding shell 4, the anti-electromagnetic interference capability of the electrical connector 100 can be improved, thereby improving the quality of data transmission.

The first installation module 1 includes a first internal circuit board 11 and a first terminal adapter block 12 mounted with the first internal circuit board 11. The second installation module 2 includes a second internal circuit board 21 and a second terminal adapter block 22 mounted with the second internal circuit board 21. The first internal circuit board 11 and the first terminal adapter block 12 include first fool-proof portions 10 which cooperate with each other. The second internal circuit board 21 and the second terminal adapter block 22 include second fool-proof portions 20 which cooperate with each other. The first fool-proof portion 10 is different from the second fool-proof portion 20, so as to prevent the first terminal adapter block 12 from being incorrectly connected to the second internal circuit board 21, and prevent the second terminal adapter block 22 from being incorrectly connected to the first internal circuit board 11.

In the illustrated embodiment of the present disclosure, the first fool-proof portions 10 include a first groove 10*a* provided on the first internal circuit board 11 and a first protrusion 10*b* provided on the first terminal adapter block 12. The second fool-proof portions 20 include a second groove 20*a* provided on the second internal circuit board 21 and a second protrusion 20*b* provided on the second terminal adapter block 22. In an embodiment of the present disclosure, the first terminal adapter block 12 and the second terminal adapter block 22 have identifiers (such as text, numbers, graphics, symbols, etc.) to facilitate identification (such as convenient for manual or CCD on the production line for identification). With this arrangement, the matching identification of the first terminal adapter block 12 and the first internal circuit board 11 is improved, and the matching identification of the second terminal adapter block 22 and the second internal circuit board 21 is also improved, thereby improving the success rate of one-time installation and the production efficiency.

The first groove 10*a* and the second groove 20*a* are different in at least one of size, shape and position. Correspondingly, the first protrusion 10*b* and the second protrusion 20*b* are different in at least one of size, shape and position. This setting can avoid wrong installation and play a role in preventing fools.

Figure 7:
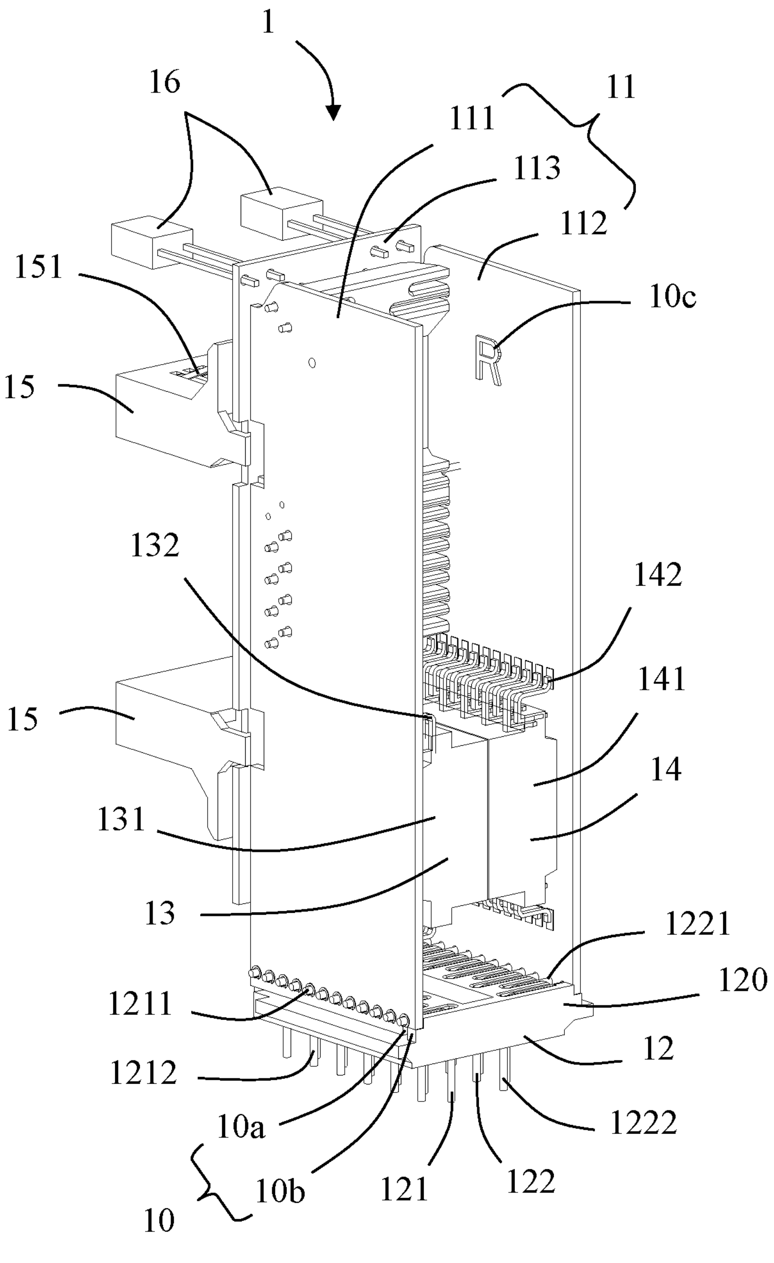
FIG. 7 is a perspective schematic view of a first installation module in FIG. 6.

Referring to FIG. 7, in the illustrated embodiment of the present disclosure, the first groove 10*a* is located at an end of the first internal circuit board 11. This setting is convenient for observation during assembly.

In addition, the first installation module 1 has a first identifier 10*c* (for example, R). The second installation module 2 has a second identifier 20*c* (for example, L). The first identifier 10*c* and the second identifier 20*c* are different.

This arrangement facilitates observation or identification during assembly and improves the assembly efficiency. In the illustrated embodiment of the present disclosure, the first identifier 10*c* is provided on the first internal circuit board 11, and the second identifier 20*c* is provided on the second internal circuit board 21.

Figure 8:
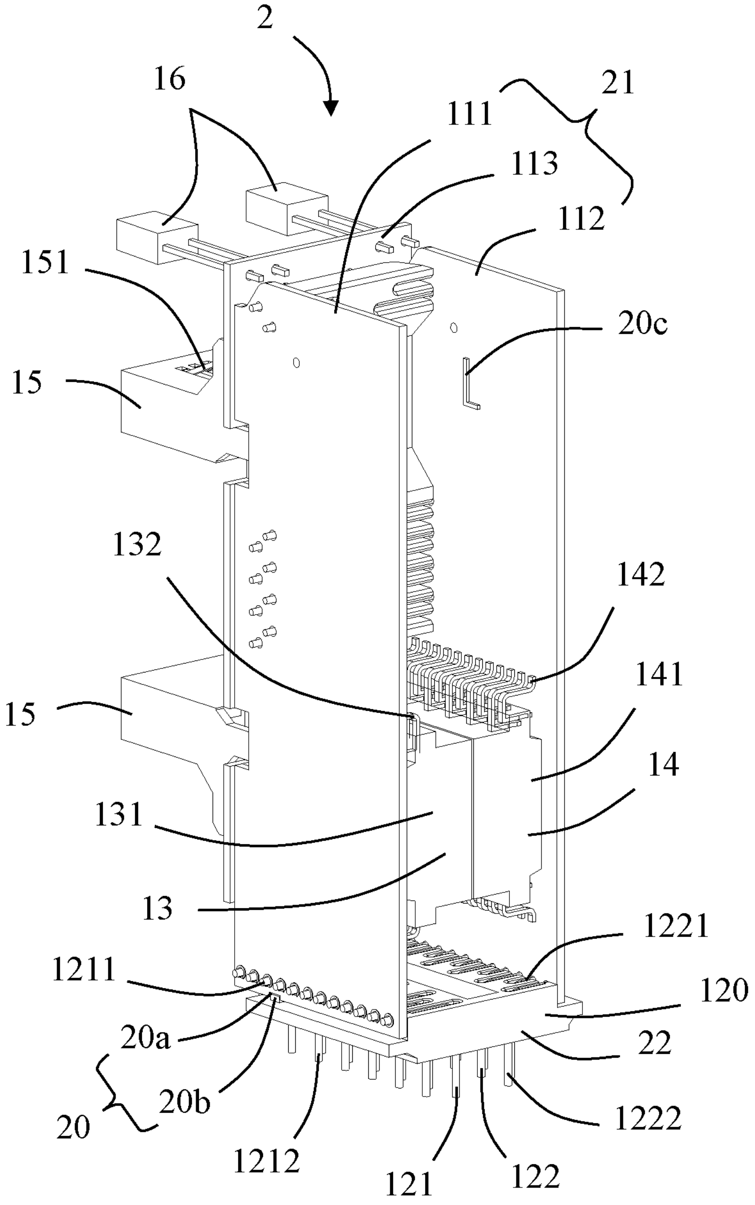
FIG. 8 is a perspective schematic view of a second installation module in FIG. 6.

Referring to FIGS. 7 and 8, specifically, in the illustrated embodiment of the present disclosure, each of the first internal circuit board 11 and the second internal circuit board 21 includes a first sub-circuit board 111, a second sub-circuit board 112 arranged face to face with the first sub-circuit board 111, and a third sub-circuit board 113 electrically connecting the first sub-circuit board 111 and the second sub-circuit board 112. The first sub-circuit board 111 is parallel to the second sub-circuit board 112. The third sub-circuit board 113 is perpendicular to the first sub-circuit board 111 and the second sub-circuit board 112. Each of the first terminal adapter block 12 and the second terminal adapter block 22 includes an insulating block 120, a plurality of first adapter terminals 121 fixed to the insulating block 120, and a plurality of second adapter terminals 122 fixed to the insulating block 120. The first adapter terminals 121 and the second adapter terminals 122 are both L-shaped and symmetrically arranged. Each first adapter terminal 121 includes a first connecting portion 1211 connected to the first sub-circuit board 111 and a first mounting portion 1212 bent from the first connecting portion 1211. Each second adapter terminal 122 includes a second connecting portion 1221 connected to the second sub-circuit board 112 and a second mounting portion 1222 bent from the second connecting portion 1221. Extending directions of the first connecting portion 1211 and the second connecting portion 1221 are opposite with each other. The first mounting portion 1212 and the second mounting portion 1222 are used for electrically connecting with the external circuit board 200. In the illustrated embodiment of the present disclosure, the first mounting portion 1212 and the second mounting portion 1222 are soldered to the external circuit board 200 by means of through hole soldering technologies. Of course, in other embodiments, the first mounting portion 1212 and the second mounting portion 1222 can also be soldered to the external circuit board 200 by surface soldering technologies.

Each of the first installation module 1 and the second installation module 2 further includes a first transmission module 13 mounted to the first sub-circuit board 111, a second transmission module 14 mounted to the second sub-circuit board 112, a plurality of terminal modules 15 mounted to the third sub-circuit board 113, and a plurality of indicator lights 16 mounted to the third sub-circuit board 113. In the illustrated embodiment of the present disclosure, each of the first installation module 1 and the second installation module 2 includes two terminal modules 15 which include an upper terminal module and lower terminal module. The first transmission module 13 and the second transmission module 14 are located between the first sub-circuit board 111 and the second sub-circuit board 112. Each terminal module 15 includes a plurality of conductive terminals 151 extending obliquely.

The first transmission module 13 includes a first insulating frame 131, at least one first coil (not shown) installed in the first insulating frame 131 and a plurality of first soldering pins 132 connected to the first coil. In the illustrated embodiment of the present disclosure, the first soldering pins 132 are soldered to the first sub-circuit board 111 by surface soldering technologies. Similarly, the second transmission module 14 includes a second insulating frame 141, at least one second coil (not shown) installed in the second insulating frame 141 and a plurality of second soldering pins 142 connected to the second coil. In the illustrated embodiment of the present disclosure, the second soldering pins 142 are soldered to the second sub-circuit board 112 by surface soldering technologies.

Compared with the prior art, by making the first fool-proof portions 10 and the second fool-proof portions 20 different in the present disclosure, the first terminal adapter block 12 can only be matched with the first internal circuit board 11, and the second terminal adapter block 22 can only be matched with the second internal circuit board 21. As a result, it prevents the first terminal adapter block 12 from being incorrectly connected to the second internal circuit board 21, and prevents the second terminal adapter block 22 from being incorrectly connected to the first internal circuit board 11. Therefore, the fool-proof function of the present disclosure can be realized.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body defining a first receiving space and a second receiving space;

a first installation module, the first installation module being at least partially installed in the first receiving space, the first installation module comprising a first internal circuit board and a first terminal adapter block installed with the first internal circuit board; and a second installation module, the second installation module being at least partially installed in the second receiving space, the second installation module comprising a second internal circuit board and a second terminal adapter block installed with the second internal circuit board;

wherein the first installation module and the second installation module are different; wherein the first internal circuit board and the first terminal adapter block comprise first fool-proof portions mating with each other, the second internal circuit board and the second terminal adapter block comprise second fool-proof portions mating with each other, and the first fool-proof portions are different from the second fool-proof portions, so as to prevent the first terminal adapter block from being incorrectly connected to the second internal circuit board, and prevent the second terminal adapter block from being incorrectly connected to the first internal circuit board; and wherein each of the first internal circuit board and the second internal circuit board comprises a first sub-circuit board and a second sub-circuit board; the first sub-circuit board of the first installation module and the second sub-circuit board of first installation module are disposed face to face with each other; the first sub-circuit board of the second installation module and the second sub-circuit board of second installation module are disposed face to face with each other;

the first sub-circuit board of the first installation module is prevented from being incorrectly assembled to the second installation module as the first sub-circuit board of the second installation module;

the second sub-circuit board of the first installation module is prevented from being incorrectly assembled to the second installation module as the second sub-circuit board of the second installation module;

the first sub-circuit board of the second installation module is prevented from being incorrectly assembled to the first installation module as the first sub-circuit board of the first installation module; and the second sub-circuit board of the second installation module is prevented from being incorrectly assembled to the first installation module as the second sub-circuit board of the first installation module.

2. The electrical connector according to claim 1, wherein the first fool-proof portions comprise a first groove provided on the first internal circuit board and a first protrusion provided on the first terminal adapter block.

3. The electrical connector according to claim 2, wherein the second fool-proof portions comprise a second groove provided on the second internal circuit board and a second protrusion provided on the second terminal adapter block.

4. The electrical connector according to claim 3, wherein the first groove and the second groove are different in at least one of size, shape and position.

5. The electrical connector according to claim 4, wherein the first groove is located at an end of the first internal circuit board.

6. The electrical connector according to claim 1, wherein the first installation module and the second installation module have different data transmission rates.

7. The electrical connector according to claim 1, wherein the first installation module has a first identifier, the second installation module has a second identifier, and the first identifier and the second identifier are different.

8. The electrical connector according to claim 7, wherein the first identifier is provided on the first internal circuit board, and the second identifier is provided on the second internal circuit board.

9. The electrical connector according to claim 1, wherein the first terminal adapter block and the second terminal adapter block have identifiers for easy identification.

10. The electrical connector according to claim 1, wherein each of the first internal circuit board and the second internal circuit board comprises a third sub-circuit board electrically connecting with the first sub-circuit board and the second sub-circuit board;

each of the first terminal adapter block and the second terminal adapter block comprises an insulating block, a plurality of first adapter terminals fixed to the insulating block, and a plurality of second adapter terminals fixed to the insulating block, each first adapter terminal comprises a first connecting portion connected to the first sub-circuit board, each second adapter terminal comprises a second connecting portion connected to the second sub-circuit board;

each of the first installation module and the second installation module comprises a first transmission module mounted to the first sub-circuit board, a second transmission module mounted to the second sub-circuit board and at least one terminal module mounted to the third sub-circuit board, the first transmission module and the second transmission module are located between the first sub-circuit board and the second sub-circuit board, and the terminal module comprises a plurality of conductive terminals extending obliquely.

11. An electrical connector assembly, comprising:

an external circuit board; and an electrical connector mounted to the external circuit board, the electrical connector comprising:

an insulating body defining a first receiving space and a second receiving space;

a first installation module, the first installation module being at least partially installed in the first receiving space, the first installation module comprising a first internal circuit board and a first terminal adapter block installed with the first internal circuit board; and a second installation module, the second installation module being at least partially installed in the second receiving space, the second installation module comprising a second internal circuit board and a second terminal adapter block installed with the second internal circuit board;

wherein the first installation module and the second installation module are different; wherein the first internal circuit board and the first terminal adapter block comprise first fool-proof portions mating with each other, the second internal circuit board and the second terminal adapter block comprise second fool-proof portions mating with each other, and the first fool-proof portions are different from the second fool-proof portions, so as to prevent the first terminal adapter block from being incorrectly connected to the second internal circuit board, and prevent the second terminal adapter block from being incorrectly connected to the first internal circuit board; and wherein each of the first internal circuit board and the second internal circuit board comprises a first sub-circuit board and a second sub-circuit board; the first sub-circuit board of the first installation module and the second sub-circuit board of first installation module are disposed face to face with each other; the first sub-circuit board of the second installation module and the second sub-circuit board of second installation module are disposed face to face with each other;

the first sub-circuit board of the first installation module is prevented from being incorrectly assembled to the second installation module as the first sub-circuit board of the second installation module;

the second sub-circuit board of the first installation module is prevented from being incorrectly assembled to the second installation module as the second sub-circuit board of the second installation module;

the first sub-circuit board of the second installation module is prevented from being incorrectly assembled to the first installation module as the first sub-circuit board of the first installation module; and the second sub-circuit board of the second installation module is prevented from being incorrectly assembled to the first installation module as the second sub-circuit board of the first installation module.

12. The electrical connector assembly according to claim 11, wherein the first fool-proof portions comprise a first groove provided on the first internal circuit board and a first protrusion provided on the first terminal adapter block.

13. The electrical connector assembly according to claim 12, wherein the second fool-proof portions comprise a second groove provided on the second internal circuit board and a second protrusion provided on the second terminal adapter block.

14. The electrical connector assembly according to claim 13, wherein the first groove and the second groove are different in at least one of size, shape and position.

15. The electrical connector assembly according to claim 14, wherein the first groove is located at an end of the first internal circuit board.

16. The electrical connector assembly according to claim 11, wherein the first installation module and the second installation module have different data transmission rates.

17. The electrical connector assembly according to claim 11, wherein the first installation module has a first identifier, the second installation module has a second identifier, and the first identifier and the second identifier are different.

18. The electrical connector assembly according to claim 17, wherein the first identifier is provided on the first internal circuit board, and the second identifier is provided on the second internal circuit board.

19. The electrical connector assembly according to claim 11, wherein the first terminal adapter block and the second terminal adapter block have identifiers for easy identification.

20. The electrical connector assembly according to claim 11, wherein each of the first internal circuit board and the second internal circuit board comprises a third sub-circuit board electrically connecting with the first sub-circuit board and the second sub-circuit board;

each of the first terminal adapter block and the second terminal adapter block comprises an insulating block, a plurality of first adapter terminals fixed to the insulating block, and a plurality of second adapter terminals fixed to the insulating block, each first adapter terminal comprises a first connecting portion connected to the first sub-circuit board, each second adapter terminal comprises a second connecting portion connected to the second sub-circuit board;

each of the first installation module and the second installation module comprises a first transmission module mounted to the first sub-circuit board, a second transmission module mounted to the second sub-circuit board and at least one terminal module mounted to the third sub-circuit board, the first transmission module and the second transmission module are located between the first sub-circuit board and the second sub-circuit board, and the terminal module comprises a plurality of conductive terminals extending obliquely.

* * * * *